(12) United States Patent
Xu et al.

(10) Patent No.: US 11,737,054 B2
(45) Date of Patent: Aug. 22, 2023

(54) METHOD FOR COMMUNICATION BETWEEN TERMINALS, TERMINAL AND SYSTEM

(71) Applicant: ZTE CORPORATION, Guangdong (CN)

(72) Inventors: Hui Xu, Guangdong (CN); Zhongwei Ji, Guangdong (CN); Chen Lu, Guangdong (CN); Jianfeng Ding, Guangdong (CN); Yaying Wang, Guangdong (CN); Fang Xie, Guangdong (CN); Xiaoquan Hua, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 101 days.

(21) Appl. No.: 16/619,183

(22) PCT Filed: Feb. 7, 2018

(86) PCT No.: PCT/CN2018/075647
§ 371 (c)(1),
(2) Date: Dec. 4, 2019

(87) PCT Pub. No.: WO2018/227985
PCT Pub. Date: Dec. 20, 2018

(65) Prior Publication Data
US 2020/0178213 A1    Jun. 4, 2020

(30) Foreign Application Priority Data
Jun. 15, 2017 (CN) .......................... 201710452798.7

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 8/24* (2013.01); *H04W 24/08* (2013.01);
(Continued)

(58) Field of Classification Search
None
See application file for complete search history.

(56) References Cited

U.S. PATENT DOCUMENTS

2016/0198339 A1    7/2016  Siomina et al.
2016/0295487 A1 * 10/2016  Pandit .................. H04W 36/30
(Continued)

FOREIGN PATENT DOCUMENTS

CN        101771429 A      7/2010
CN        102447538 A      5/2012
(Continued)

OTHER PUBLICATIONS

WIPO, International Search Report dated Apr. 3, 2018.
(Continued)

*Primary Examiner* — Chi H Pham
*Assistant Examiner* — Raul Rivas
(74) *Attorney, Agent, or Firm* — Li & Cai Intellectual Property (USA) Office (57) ABSTRACT

A method for communication between terminals, a terminal and a system are provided. The method includes steps of: determining, by a terminal, at least two carriers selected from pre-configured carriers; and sending, by the terminal, information to another terminal over the at least two carriers.

17 Claims, 8 Drawing Sheets

(51) Int. Cl.
*H04W 8/24* (2009.01)
*H04W 24/08* (2009.01)
*H04W 72/0453* (2023.01)
*H04W 72/52* (2023.01)
*H04W 72/56* (2023.01)

(52) U.S. Cl.
CPC ....... *H04W 72/0453* (2013.01); *H04W 72/52* (2023.01); *H04W 72/56* (2023.01)

(56) References Cited

U.S. PATENT DOCUMENTS

| | | |
|---|---|---|
| 2017/0223708 A1 | 8/2017 | Jung et al. |
| 2017/0230919 A1* | 8/2017 | Siomina .............. H04W 52/346 |
| 2017/0245243 A1 | 8/2017 | Siomina et al. |
| 2018/0020339 A1* | 1/2018 | Agiwal ............. H04W 72/0453 |
| 2019/0174503 A1* | 6/2019 | Adachi ................ H04W 4/021 |
| 2019/0261414 A1* | 8/2019 | Ron ...................... H04W 72/02 |
| 2019/0281595 A1* | 9/2019 | Zhang ................. H04W 72/048 |
| 2020/0037126 A1* | 1/2020 | Lee ....................... H04L 5/0048 |

FOREIGN PATENT DOCUMENTS

| | | |
|---|---|---|
| CN | 105764144 A | 7/2016 |
| CN | 106559872 A | 4/2017 |
| CN | 106559911 A | 4/2017 |
| CN | 106576334 A | 4/2017 |
| CN | 106797301 A | 5/2017 |
| CN | 106797304 A | 5/2017 |
| WO | WO 2016117936 A1 | 7/2016 |

OTHER PUBLICATIONS

Support Multi-carrier Multi-PLMN Operations for PC5 Based V2X (3GPP TSG RAN WG2 Meeting #95 R2-164921 Gothenburg, Sweden, Aug. 22-26, 2016).

China Patent Office, Second Office Action regarding Chinese patent application No. CN201710452798.7 dated Aug. 20, 2021.

* cited by examiner

METHOD FOR COMMUNICATION BETWEEN TERMINALS, TERMINAL AND SYSTEM

CROSS REFERENCE TO RELATED APPLICATION

This application claims priority to Chinese patent application No. 201710452798.7, filed on Jun. 15, 2017, the contents of which are incorporated herein by reference in its entirety.

TECHNICAL FIELD

The present disclosure relates to communication technologies, and in particular, to a method for communication between terminals, a terminal and a system.

BACKGROUND

Figure 1:
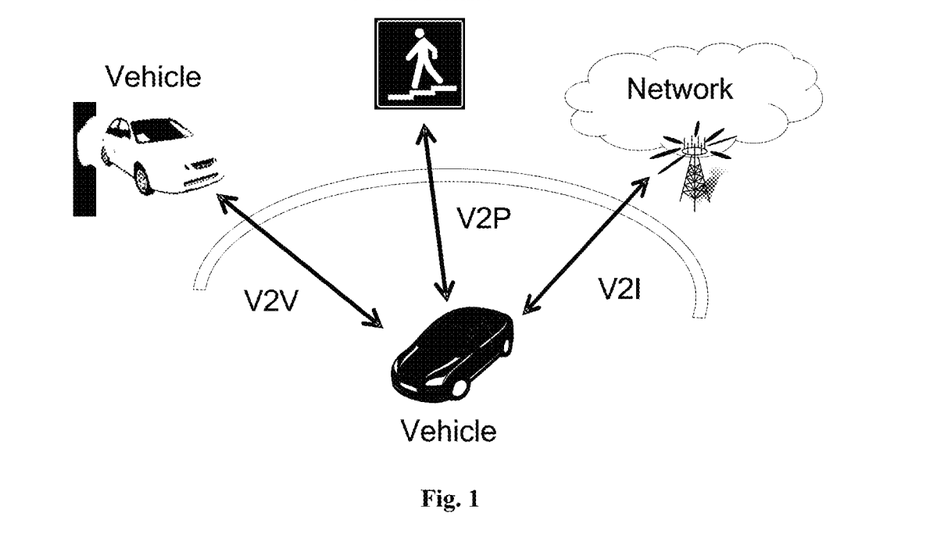
FIG. 1 is a schematic diagram illustrating the communication in the V2X in the existing art.

V2X (Vehicle to X), as shown in FIG. 1, refers to interconnection and interworking between vehicles (Vehicle to Vehicle, V2V), between vehicles and pedestrians (Vehicle to Pedestrian, V2P), and between vehicles and roads (infrastructures) (Vehicle to Infrastructure, V2I) by using various communication technologies, in which information can be effectively utilized by extracting and sharing information, or the like on an information network platform, the vehicles can be effectively managed, and comprehensive services for vehicles can be provided.

With the development of new mobile communication technologies in recent years, the research on implementing communication between terminals in the V2X using LTE (Long Term Evolution) technology has been proposed.

RSU (Road Side Unit) has the function of a gateway and can receive a request from a vehicle, so that the vehicle can access to the network. In addition, the RSU also has the functions of data operation, storage and forwarding. In LTE, the RSU may be implemented by a stationary UE or eNB, and V2V, V2I and V2P may be implemented by a PC5 interface and a Uu interface, where the PC5 interface refers to an air interface of device to device (D2D) and the Uu interface refers to an air interface of UE to eNB.

However, in the existing research, the communication between devices can only adopt a single PC5 carrier, and the speed and reliability of the V2X service are limited.

This section is background information related to the present disclosure, but this background information is not necessarily prior art.

SUMMARY

Embodiments of the present disclosure provide a method for communication between terminals, a terminal and a system, which realize the communication directly carried out between terminals through a plurality of carriers.

In order to achieve the purpose of the present disclosure, an embodiment of the present disclosure provides a method for communication between terminals, including steps of: determining, by a terminal, at least two carriers selected from pre-configured carriers; and sending, by the terminal, information to another terminal over the at least two carriers.

According to an embodiment of the present disclosure, the information includes resource allocation information and service data, where the resource allocation information is used for indicating a resource location of the service data on a carrier, and the service data on different carriers is the same or different.

According to an embodiment of the present disclosure, the step of determining, by a terminal, at least two carriers selected from pre-configured carriers includes: sending, by the terminal, a resource request message to a base station, receiving, by the terminal, allocation information of the at least two carriers returned by the base station, and determining, by the terminal, the at least two carriers selected by the base station; or selecting, by the terminal, the at least two carriers from the pre-configured carriers according to at least one of the following conditions: carrier priority, congestion level of carrier, pre-configured rule, capability of the terminal, or service requirement.

According to an embodiment of the present disclosure, the step of sending, by the terminal, information to another terminal over the at least two carriers respectively includes: determining, by the terminal, one of the at least two carriers as a main carrier, and sending, by the terminal, resource allocation information for indicating resource locations of service data on all carriers and service data over the main carrier; and sending, by the terminal, service data over each carrier except the main carrier; or, sending, by the terminal, the resource allocation information and the service data over each carrier, respectively.

According to an embodiment of the present disclosure, in a case where the terminal includes a single transmitter, the terminal sends the information over the at least two carriers in a time division multiplexing mode.

An embodiment of the present disclosure further provides a method for communication between terminals, including steps of: monitoring, by a terminal, at least one carrier of at least two pre-configured carriers; and receiving, by the terminal, service data sent by another terminal over the at least two carriers according to monitored resource allocation information.

According to an embodiment of the disclosure, the step of monitoring, by a terminal, at least one carrier of at least two pre-configured carriers includes: monitoring, by the terminal, a pre-configured main carrier to acquire resource allocation information of all carriers carried on the main carrier; or, monitoring, by the terminal, all carriers to acquire resource allocation information carried on each carrier.

An embodiment of the present disclosure further provides a terminal, including: a carrier determination module configured to determine at least two carriers selected from pre-configured carriers; and a sending module configured to respectively send information to an opposite terminal over the at least two carriers selected by the carrier determination module.

According to an embodiment of the present disclosure, the carrier determination module includes: a sending sub-module configured to send a resource request message to a base station; and a receiving sub-module configured to receive resource allocation information of the at least two carriers returned by the base station and determine the at least two carriers selected by the base station.

According to an embodiment of the present disclosure, the carrier determination module includes: a selection sub-module configured to select the at least two carriers from the pre-configured carriers according to at least one of the following conditions: carrier priority, congestion level of carrier, pre-configured rule, capability of the terminal, or service requirement.

According to an embodiment of the present disclosure, the sending module is configured to determine one of the at least two carriers as a main carrier, and send resource allocation information for indicating resource locations of service data on all carriers and service data over the main carrier, and send service data over each carrier except the main carrier; or configured to send the resource allocation information and the service data over each carrier respectively.

According to an embodiment of the present disclosure, the sending module includes a single transmitter and is configured to send the information over the at least two carriers in a time division multiplexing mode.

An embodiment of the present disclosure further provides a terminal, including: a monitoring module configured to monitor at least one carrier of at least two pre-configured carriers; and a receiving module configured to receive service data sent by another terminal over the at least two carriers according to resource allocation information monitored by the monitoring module.

According to an embodiment of the present disclosure, the monitoring module is configured to monitor a pre-configured main carrier to acquire resource allocation information of all carriers carried on the main carrier; or configured to monitor all carriers to acquire resource allocation information carried on each carrier.

An embodiment of the present disclosure further provides a system for communication between terminals, the system including at least one sending terminal and at least one receiving terminal, where the sending terminal is the terminal with the information sending function provided by the present disclosure, and the receiving terminal is the terminal with the information receiving function provided by the present disclosure.

According to the method, the terminal and the system provided by the embodiments of the present disclosure, the communication can be directly carried out between the terminals through a plurality of carriers, and the speed and reliability of the communication between the terminals are improved. For the V2X service, multi-PC5 carrier communication between terminals in the V2X can be realized, and the speed and reliability of the V2X service are improved. When the transmission is carried out by adopting the main carrier and the non-main carrier, the resource allocation information is transmitted only over the main carrier, so that the resource consumption can be reduced. When the resource allocation information and the service data are transmitted over all carriers, respectively, the reliability of service transmission can be ensured, and the success of service transmission can be ensured to even if partial carrier signals are failed to be transmitted.

Additional features and advantages of the present disclosure will be set forth in the following description, and in part will be obvious from the description, or may be learned by the practice of the present disclosure. The objectives and other advantages of the present disclosure may be realized and attained by the structure particularly pointed out in the description and claims as well as the drawings.

BRIEF DESCRIPTION OF THE DRAWINGS

The accompanying drawings illustrated herein serve to provide a further understanding of the present disclosure and constitute a part of the specification, and together with the embodiments of the present application serve to explain the present disclosure, and do not limit the present disclosure.

DETAILED DESCRIPTION

To make the objects, aspects and advantages of the present disclosure more apparent, embodiments of the present disclosure will be described in detail below with reference to the accompanying drawings. It should be noted that the embodiments and features of the embodiments in the present application may be arbitrarily combined with each other without conflict.

The steps illustrated in the flowcharts of the figures may be performed in a computer system such as a set of computer-executable instructions. Also, while a logical order of the steps is shown in the flowcharts, in some cases, the steps shown or described may be performed in an order different than that shown herein.

The steps and operations in the various embodiments presented in the present disclosure may be arbitrarily combined without conflict.

Figure 2A:
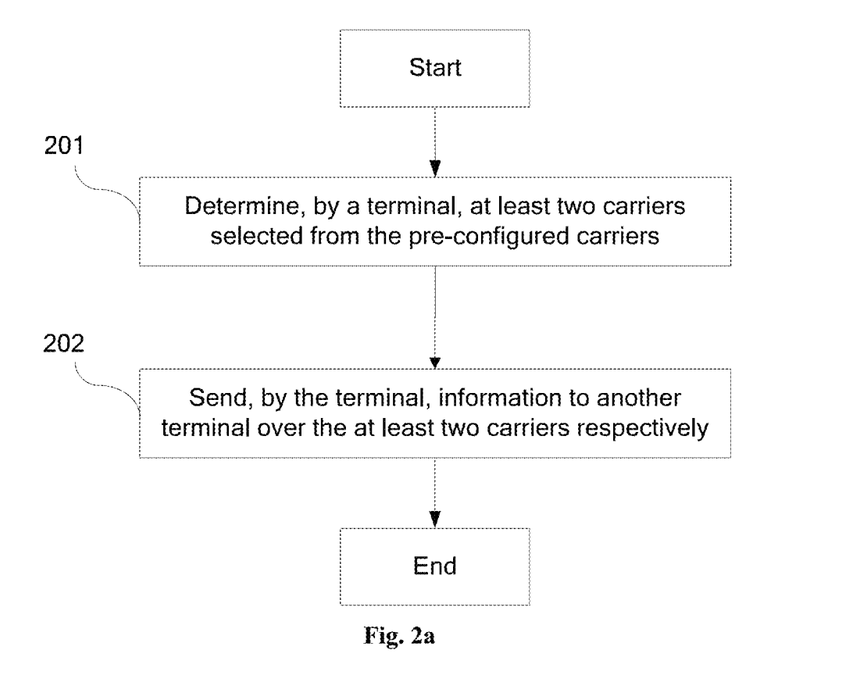
FIG. 2a is a flowchart illustrating a method for communication between terminals according to an embodiment of the present disclosure.

An embodiment of the present disclosure provides a method for communication between terminals, and as shown in FIG. 2a, the method includes steps 201 and 202.

In the step 201, a terminal determines at least two carriers selected from the pre-configured carriers.

The at least two carriers may be selected and determined by the terminal itself from the pre-configured carriers (for convenience of description, hereinafter referred to as "autonomous selection mode"). The terminal may also send a resource request message to a base station, the base station performs resource allocation for the terminal according to the resource request message, selects the at least two carriers from the pre-configured carriers, and sends allocation information of the carriers to the terminal, and the terminal determines the at least two carriers according to the received allocation information (for convenience of description, hereinafter referred to as "base station indication mode").

The pre-configured carrier refers to a carrier for a specific service, which is defined by the industry. For example, assuming that the service is a V2X service, enterprises, governments, and the like related to the V2X service may pre-configure carriers in one or more frequency bands to be dedicated to the V2X service, and the terminal or the base station select the at least two carriers from the frequency band(s).

The at least two carriers may be selected according to at least one of the following conditions: carrier priority, congestion level of carrier, pre-configured rule, capability of the terminal, and service requirement. Taking the V2X service as an example, a PC5 carrier with high priority may be selected, and/or a PC5 carrier with low congestion level may be selected, and/or a PC5 carrier may be selected according to the sending capability of the terminal itself (e.g., the terminal has two PC5 transmitters, then two PC5 carriers may be selected), and/or a PC5 carrier may be selected according to pre-configured rule(s) (e.g., number of pre-configured PC5 carriers, strength of carrier, priority, etc.), and/or a PC5 carrier may be selected according to the requirement of the V2X service (e.g., the high speed or high reliability V2X service generally requires a plurality of PC5 carriers).

In the step 202, the terminal sends information to another terminal over the at least two carriers respectively.

The information includes resource allocation information and service data, where the resource allocation information is used for indicating a resource location of the service data on a carrier, and the service data on different carriers is the same or different.

The terminal may send the resource allocation information corresponding to each carrier and the service data over each carrier respectively; or may select a single or several carriers to send scheduling information indicating resource allocations of several or all carriers over the single or several carriers, and send the service data over each carrier. For example, the terminal may determine one carrier as a main carrier, and send scheduling information indicating resource allocation of each of the at least two carriers and service data over the main carrier; the terminal sends service data over each carrier except the main carrier; and the service data on different carriers may be the same or different.

According to the method for communication between terminals provided by the embodiments of the present disclosure, the communication can be directly carried out between the terminals through a plurality of carriers, and the speed and reliability of the communication between the terminals are improved. When the method is applied to the V2X, multi-PC5 carrier communication between terminals in the V2X can be realized, and the speed and reliability of the V2X service are improved. When the transmission is carried out by adopting the main carrier and the non-main carrier, the resource allocation information is transmitted only over the main carrier, so that the resource consumption can be reduced. When the resource allocation information and the service data are transmitted over all carriers, respectively, the reliability of service transmission can be ensured, and the success of service transmission can be ensured even if partial carrier signals are failed to be transmitted.

In an optional embodiment, the terminal is an UE (User Equipment), and before the step 201, the UE determines whether the UE is in the coverage of the base station. If so, the base station selects the carriers and informs the UE in the step 201; otherwise, the UE autonomously selects the carriers.

In an optional embodiment, the terminal is an UE, and in the step 201, the UE sends a resource request message to the base station, and if receiving the allocation information of the carriers from the base station fails, the UE autonomously selects the carriers.

In an optional embodiment, the terminal is an UE, and in the step 201, the UE directly and autonomously selects the carriers without considering whether the UE is in the coverage of the base station.

When the carriers are selected by the base station, the requirement on the terminal can be reduced, and meanwhile, because the base station uniformly distributes the carrier, the load balance of the carrier is easy to be realized by the base station. When the terminal itself selects the carriers, a wide adaptability of service transmission can be ensured, and the communication between the terminals can be realized even when the terminal leaves the coverage of the base station, which is very important in some areas where it is inconvenient to install the base station.

In an optional embodiment, the terminal may also indicate the at least two selected carriers in the form of an index. For example, assuming that 8 carriers are selected, 3 bits are used to indicate the 8 carries: 000, 001, 010, 100, 011, 110, 101 and 111.

Optionally, the terminal sorts the 8 carriers, and the sorting order of the carriers may indicate the performance of the carriers for transmitting the resource allocation information and the service data. Optionally, the performance order of the carriers represented by each identifier is 000>001>010>100>011>110>101>111, it is easy to understand that other orders are also possible. If the priority order of each carrier configured by an operator or the like when the carriers are configured is as follows: carrier 1>carrier 2>carrier 3>carrier 4>carrier 5>carrier 6>carrier 7>carrier 8, then carrier 1 may be identified using 000, carrier 2 may be identified using 001, and so on, and carrier 8 may be identified using 111. The terminal may also sort the carriers according to CBR (Channel Busy Ratio). CBR is a parameter defined in 3GPP for measuring the congestion level of a channel, and is defined as the proportion of sub-channels in a resource pool which have an energy exceeding a threshold value in a period of time (generally 100 ms), and a higher CBR value indicates a higher congestion level of the channel. If the order of the CBR values of the carriers is as follows: carrier 1>carrier 2>carrier 3>carrier 4>carrier 5>carrier 6>carrier 7>carrier 8, then carrier 1 may be identified using 111, carrier 2 may be identified using 101, and so on, and carrier 8 may be identified using 000. Needless to say, the carriers may also be sorted according to other parameters, and will not be described repeatedly here.

In an optional embodiment, the terminal may include a single transmitter, and the terminal may send the information over the at least two carriers in a time division multiplexing mode, and the other terminal may receive the information sent over the at least two carriers in a time division multiplexing mode. The time division multiplexing mode may be carried in the scheduling information, or may be preset by an operator or the like. In this way, the terminal having the single transmitter can be applied to the multi-carrier communication as well.

In an optional embodiment, the terminal may also send synchronization information, such as SLSS (Sidelink Synchronization signal). The synchronization source of the plurality of PC5 carriers may be one of: a common synchronization source (e.g., GNSS (Global Navigation Satellite System)), and an individual synchronization source for each carrier. By having the synchronization information, time synchronization between the terminals is ensured.

Figure 2B:
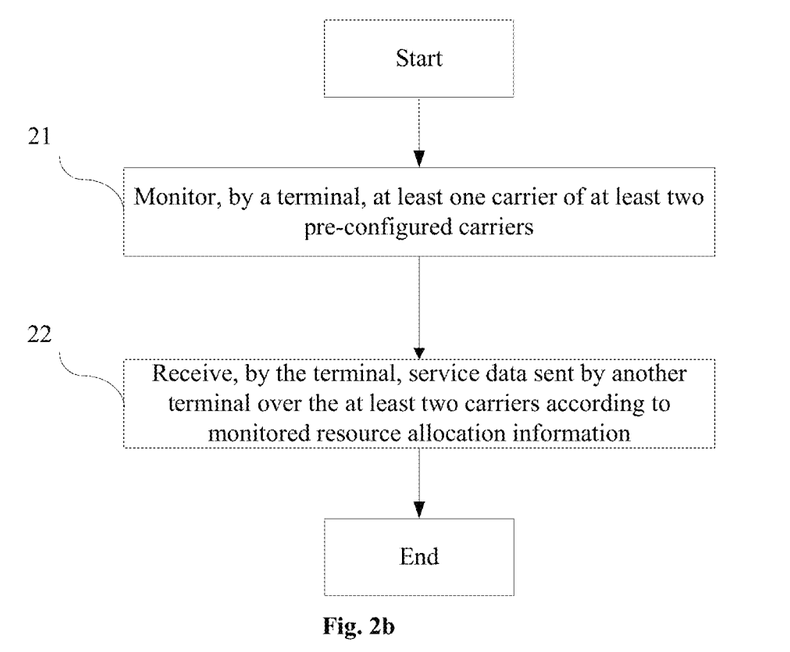
FIG. 2b is a flowchart illustrating a method for communication between terminals according to another embodiment of the present disclosure.

An embodiment of the present disclosure provides a method for communication between terminals, and as shown in FIG. 2b, the method includes steps 21 and 22.

In the step 21, the terminal monitors at least one carrier of at least two pre-configured carriers.

The terminal monitors a pre-configured main carrier to acquire resource allocation information of all carriers carried on the main carrier; or, the terminal monitors all carriers to acquire resource allocation information carried on each carrier.

In the step 22, the terminal receives the service data sent by another terminal over the at least two carriers according to the monitored resource allocation information.

It is easy to understand that the terminals in FIGS. 2a and 2b may be different terminals, and may be a terminal sending information and a terminal receiving information, respectively, or may be the same terminal, i.e. sending information as a sending terminal and receiving information as a receiving terminal.

In order that the present disclosure can be more clearly understood, some preferred embodiments are set forth below. It is to be understood that the following embodiments are merely illustrative and are not intended to limit the present disclosure to the specific embodiments.

First Embodiment

Figure 3:
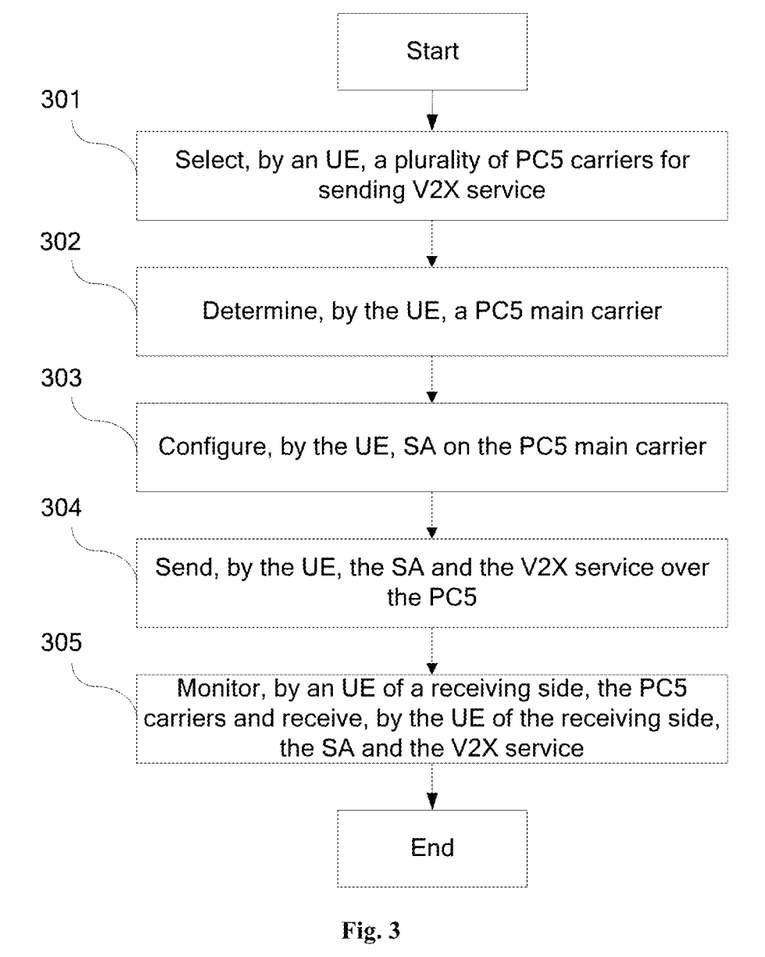
FIG. 3 is a flowchart illustrating a method for communication between terminals according to a first embodiment of the present disclosure.

The first embodiment of the present disclosure provides a method for communication between terminals, which is applied to the V2X based on LTE technology, and as shown in FIG. 3, the method includes steps 301 to 305.

In the step 301, an UE selects a plurality of PC5 carriers for sending V2X service.

The UE may select the plurality of PC5 carriers based on the base station indication mode or the autonomous selection mode. In the autonomous selection mode, the UE may first sense a plurality of PC5 carriers and then select at least two PC5 carriers from the sensed carriers based on one or more of: carrier priority, congestion level of carrier, UE capability, sensing result (e.g. sensing whether the current carrier is available or not), pre-configured rule, V2X service requirement.

The sensing means that the UE measures the energy of the reference signal in a candidate resource pool, if the energy is lower than a preset threshold value, the resource is available, otherwise, the resource is probably occupied. The sensing may also include resource reservation, i.e., the UE reserves a resource to be occupied for a certain time range according to the sensing result.

In the step 302, the UE determines a PC5 main carrier.

For the base station indication mode, the base station designates the PC5 main carrier, and the UE determines the PC5 main carrier according to the indication of the base station. For the autonomous selection mode, the UE autonomously selects the PC5 main carrier, for example, the carrier with the highest priority is selected as the main carrier. After selecting the main carrier, the UE may indicate the main carrier in one of the following information in the carrier: MasterinformationBlock-SL (master information block-side link) and SA (Scheduling Assignment). For example, whether or not the current carrier is a main carrier may be indicated by directly using "0" and "1" in the information, or the index number of the main carrier may be directly described in the information.

In the step 303, the UE configures the SA on the PC5 main carrier.

In addition to indicating the resource allocation of the PC5 main carrier, the SA in the PC5 main carrier further includes resource allocation information of other PC5 carriers for sending the V2X service, for example, the PC5 carriers are ordered based on their priorities, and the SA includes each PC5 carrier and corresponding resource allocation information, as follows:

000: resource allocation;
001: resource allocation;
...
111: resource allocation.

Where 000, 001, and 111 are indexes of the PC5 carriers, and the resource allocation includes time-frequency location information of the service data.

In the step 304, the UE sends the SA and the V2X service over the PC5.

The UE sends the SA of all PC5 carriers sending V2X service over the PC5 main carrier and sends the V2X service over a corresponding PC5 carrier. The UE may also send a synchronization signal SLSS, a system message MasterInformation Block-SL, etc. over the PC5 main carrier.

In the step 305, an UE of a receiving side monitors the PC5 carriers and receives the SA and the V2X service.

The UE of the receiving side monitors the PC5 carriers, if the UE knows the PC5 main carrier, e.g., the UE may know the main carrier through RRC signaling sent by the base station in the base station indication mode, the UE of the receiving side directly monitors the PC5 main carrier, acquires resource information of the service data on each PC5 carrier according to the SA carried on the PC5 main carrier, and further receives the V2X service over the corresponding PC5 carrier. Otherwise, the UE of the receiving side monitors all PC5 carriers, acquires the PC5 main carrier therefrom, receives the SA over the PC5 main carrier, and receives the V2X service over the corresponding PC5 carrier according to the SA.

For the UE having a single receiver, the SA and V2X service can only be received over the main carrier. If the UE of the sending side sends the V2X service over a plurality of PC5 carriers in a TDM (time division multiplexing) mode, the UE having the single receiver may receive the V2X service in a TDM mode, that is, by tuning the receiving frequency band for time-division reception.

Second Embodiment

Figure 4:
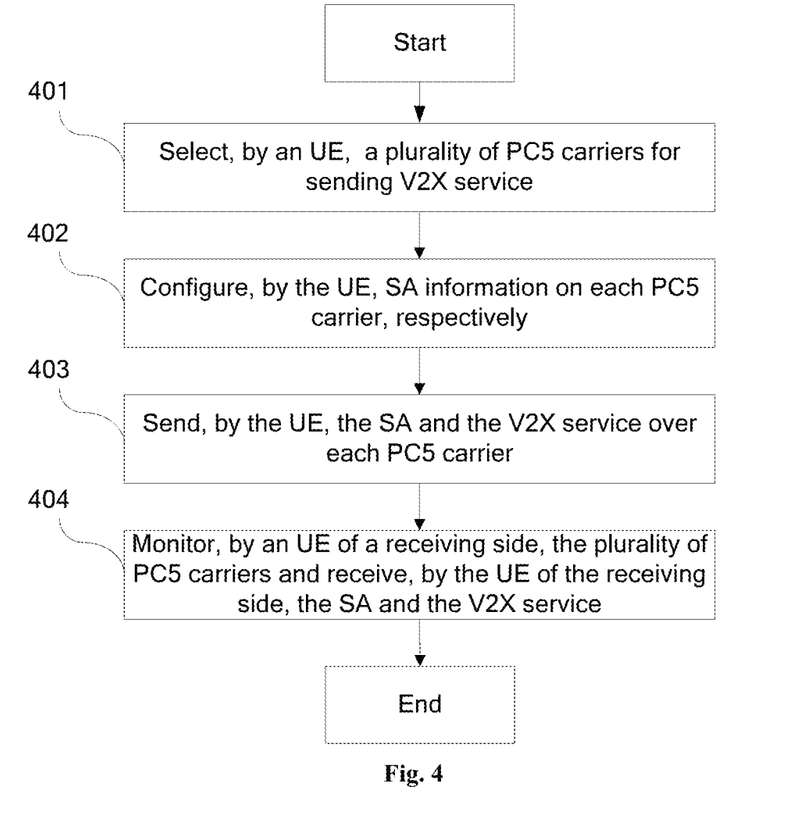
FIG. 4 is a flowchart illustrating a method for communication between terminals according to a second embodiment of the present disclosure.

The second embodiment of the present disclosure provides a method for communication between terminals, which is applied to the V2X based on LTE technology, and as shown in FIG. 4, the method includes steps 401 to 404.

In the step 401, an UE selects a plurality of PC5 carriers for sending V2X service.

This step is the same as the step 201 in the first embodiment, and is not described here again.

In the step 402, the UE configures SA information on each PC5 carrier, respectively.

The UE configures the SA information on each of the selected PC5 carriers.

In the step 403, the UE sends the SA and the V2X service over each PC5 carrier.

The UE may send the same V2X service or different V2X services over each selected PC5 carrier. In order to ensure backward compatibility, that is, the UE of R14 may also receive the required V2X service, the UE sends the same V2X service, or sends security related V2X service over the PC5 carrier with the highest priority, and sends non-security related service over other PC5 carrier(s), then the UE of R14 may receive security related V2X service only over the carrier with the highest priority, and the UE of R15 or newer version may receive the service over a plurality of PC5 carriers, respectively.

The UE may send a corresponding synchronization signal and system message over each selected PC5 carrier, and the synchronization source for each PC5 carrier may be the same or different.

In the step 404, an UE of a receiving side monitors the plurality of PC5 carriers and receives the SA and the V2X service.

The UE of the receiving side monitors the plurality of PC5 carriers and receives corresponding SA and V2X service, respectively. If the UE is a single receiver, tuning needs to be performed among different PC5 carriers, and generally, it is first ensured that the UE receives the V2X service on the PC5 carrier with the highest priority.

Third Embodiment

Figure 5:
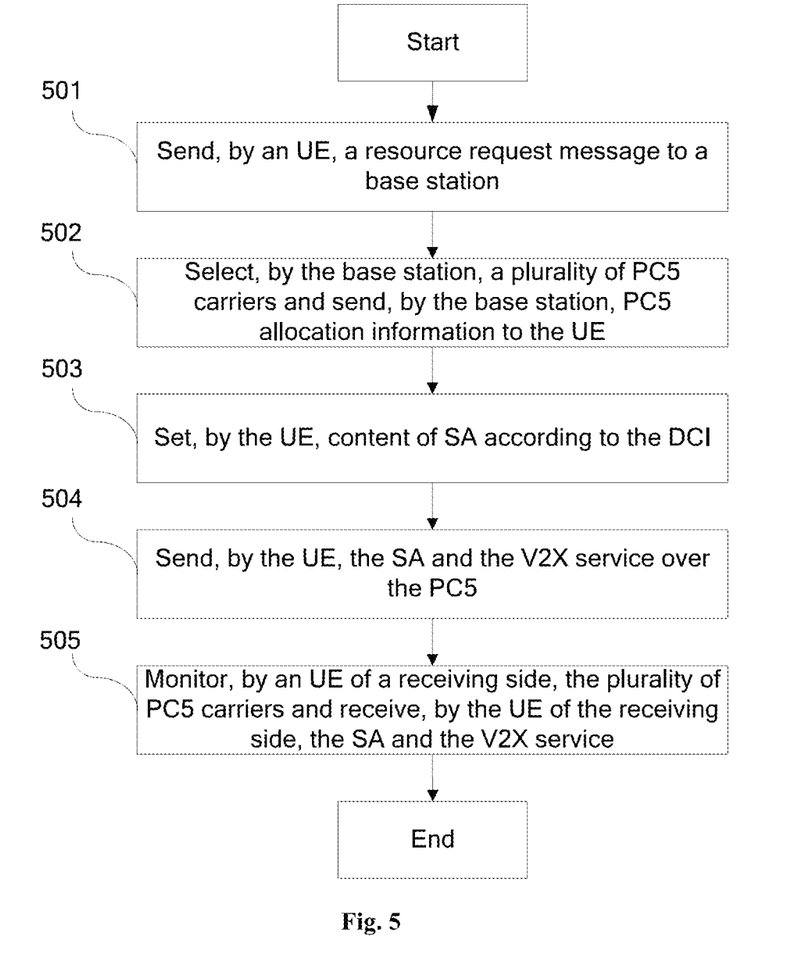
FIG. 5 is a flowchart illustrating a method for communication between terminals according to a third embodiment of the present disclosure.

The third embodiment of the present disclosure provides a method for communication between terminals, which is applied to the V2X based on LTE technology, and as shown in FIG. 5, the method includes steps 501 to 505.

In the step 501, an UE sends a resource request message to a base station.

The UE prepares to send the V2X service over a PC5 carrier, and requests the base station for the required PC5 carrier resources.

In the step 502, the base station selects a plurality of PC5 carriers and sends PC5 allocation information to the UE.

The base station selects the plurality of PC5 carriers based on at least one of the following information: request message of UE, capability of UE, load of PC5 carrier, priority of PC5 carrier and operator policy. The request message of the UE refers to a QoS (Quality of Service) requirement of a V2X service that the UE is ready to send, the capability of the UE refers to the number of transmitters of the UE, and the operator policy refers to a comprehensive consideration of an operator on the network deployment and service requirement. The base station sends the allocation information of the plurality of PC5 carriers through DCI (Downlink Control Information). Alternatively, the base station may designate a PC5 main carrier and indicate the main carrier in the DCI.

In the step 503, the UE sets content of SA according to the DCI.

The UE monitors the DCI returned by the base station and sets the content of the SA according to the received DCI. If the PC5 main carrier exists in the DCI, the UE sets allocation information of the plurality of PC5 carriers in the PC5 main carrier, otherwise, the UE sets the content of the SA in the plurality of PC5 carriers, respectively.

In the step 504, the UE sends the SA and the V2X service over the PC5.

If there is a PC5 main carrier, the UE sends all SAs over the PC5 main carrier, otherwise the UE sends the corresponding SA over each PC5 carrier. The UE sends a corresponding V2X service over each PC5 carrier.

In the step 505, an UE of a receiving side monitors the PC5 carriers and receives the SA and the V2X service.

Fourth Embodiment

Figure 6:
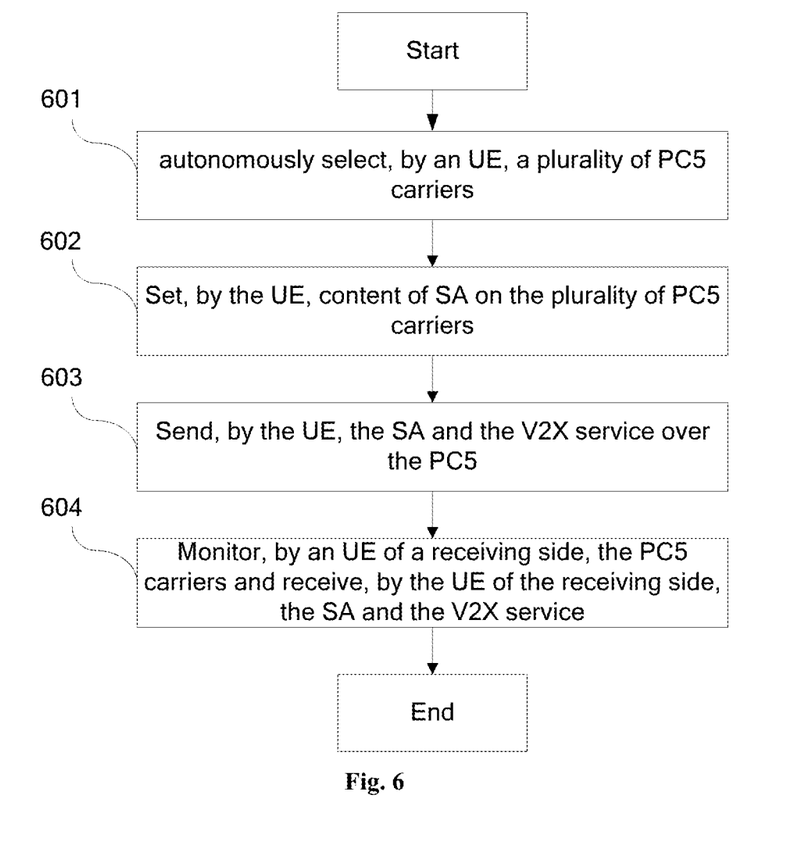
FIG. 6 is a flowchart illustrating a method for communication between terminals according to a fourth embodiment of the present disclosure.

The fourth embodiment of the present disclosure provides a method for communication between terminals, which is applied to the V2X based on LTE technology, and as shown in FIG. 6, the method includes steps 601 to 604.

In the step 601, the UE autonomously selects a plurality of PC5 carriers.

In the step 602, the UE sets content of SA on the plurality of PC5 carriers.

The UE senses each selected PC5 carrier, determines the resource location of the V2X service on each PC5 carrier according to the sensing result, and sets the content of the SA on each PC5 carrier.

In the step 603, the UE sends the SA and the V2X service over the PC5.

The UE may select a PC5 main carrier (e.g., the PC5 carrier with the highest priority) and send the content of the SA for all PC5 carriers over the PC5 main carrier, e.g., combine all SAs into one and send the same over the PC5 main carrier. The UE sends a corresponding V2X service over each PC5 carrier.

In the step 604, an UE of a receiving side monitors the PC5 carriers and receives the SA and the V2X service.

Fifth Embodiment

Figure 7:
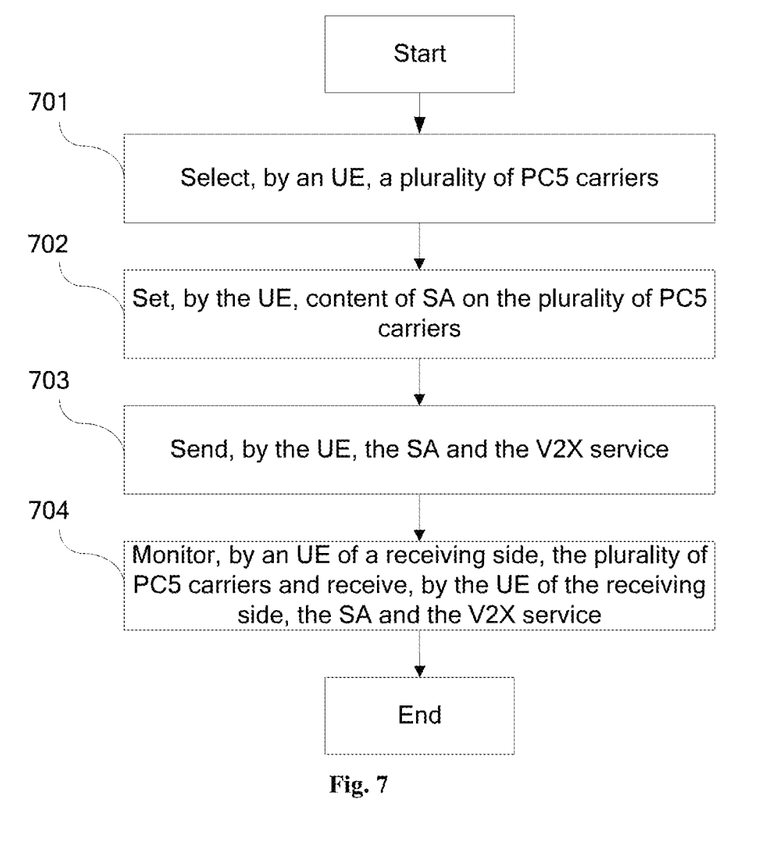
FIG. 7 is a flowchart illustrating a method for communication between terminals according to a fifth embodiment of the present disclosure.

The fifth embodiment of the present disclosure provides a method for communication between terminals, which is applied to the V2X based on LTE technology, where the UE sends the V2X service through a plurality of PC5 carriers in a time division multiplexing mode, and as shown in FIG. 7, the method includes steps 701 to 704.

In the step 701, the UE selects a plurality of PC5 carriers.

In the step 702, the UE sets content of SA on the plurality of PC5 carriers.

In the step 703, the UE sends the SA and the V2X service.

If there is a PC5 main carrier, the UE sends an aggregated content of the SA over the PC5 main carrier, otherwise the UE sends a corresponding SA and V2X service over the plurality of PC5 carriers in a time division multiplexing mode. Specifically, the UE sends the SA and V2X service over the PC5 main carrier or the PC5 carrier with the highest priority, and then sends the corresponding SA and V2X service according to the priority ranking (highest to lowest) or congestion level ranking (lowest to highest) of the PC5 carriers respectively, i.e., the UE sends the SA and the V2X service over the first ranked PC5 carrier first, then the UE tunes the transmitter to the second ranked PC5 carrier, sends the SA and the V2X service over the second PC5 carrier, and then continues for the third PC5 carrier, until all of the selected PC5 carriers complete the transmission.

The plurality of PC5 carriers is sorted according to one of: priority of PC5 carrier, and congestion level of PC5 carrier, e.g., CBR value.

In the step 704, an UE of a receiving side monitors the plurality of PC5 carriers and receives the SA and the V2X service.

Figure 8:
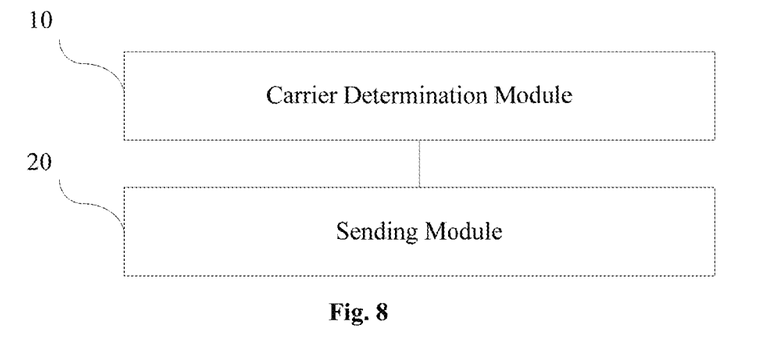
FIG. 8 is a schematic diagram illustrating a structure of a terminal according to an embodiment of the present disclosure.

Based on the same technical concept as that of the method embodiments, an embodiment of the present disclosure further provides a terminal, and as shown in FIG. 8, the terminal includes: a carrier determination module 10 configured to determine at least two carriers selected from pre-configured carriers; and a sending module 20 configured to respectively send information to an opposite terminal over the at least two carriers selected by the carrier determination module 10.

Figure 9:
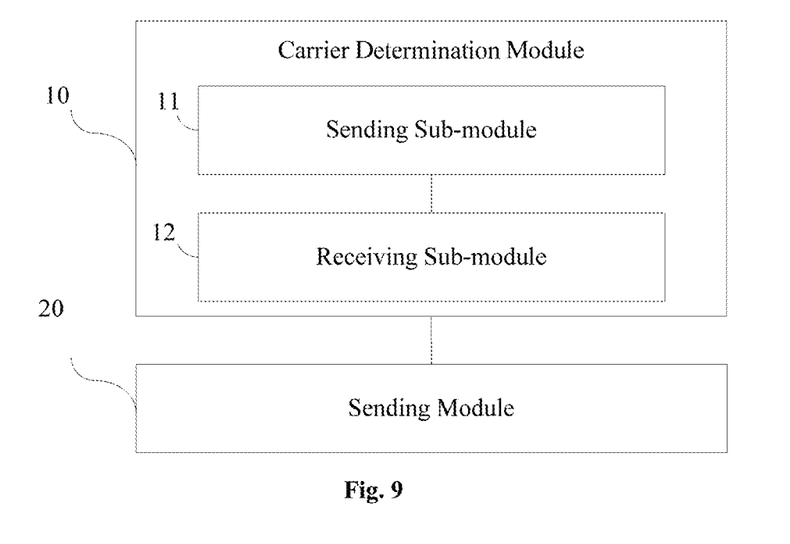
FIG. 9 is a schematic diagram illustrating a structure of a terminal according to another embodiment of the present disclosure.

Preferably, as shown in FIG. 9, the carrier determination module 10 includes: a sending sub-module 11 configured to send a resource request message to a base station; and a receiving sub-module 12 configured to receive resource allocation information of the at least two carriers returned by the base station and determine the at least two carriers selected by the base station.

Figure 10:
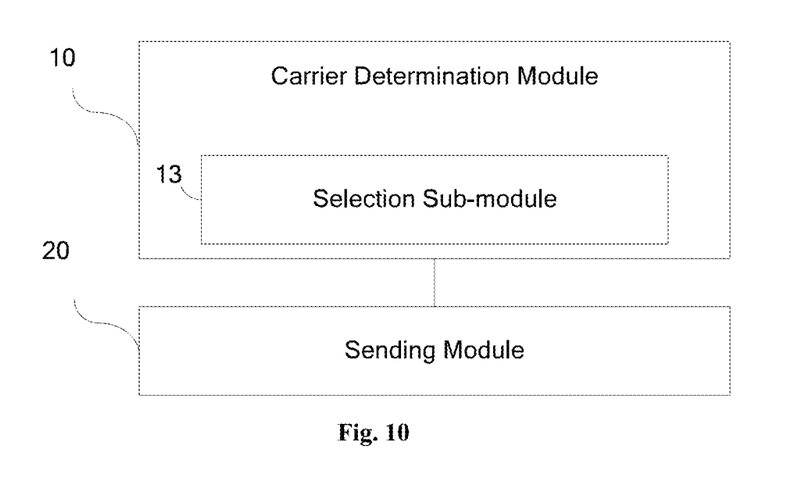
FIG. 10 is a schematic diagram illustrating a structure of a terminal according to still another embodiment of the present disclosure.

Preferably, as shown in FIG. 10, the carrier determination module 10 may further include: a selection sub-module 13 configured to select the at least two carriers from the pre-configured carriers according to at least one of the following conditions: carrier priority, congestion level of carrier, pre-configured rule, capability of the terminal, and service requirement.

The carrier determination module 10 may include the modules 11 to 13.

Preferably, the sending module 20 is configured to: determine one of the at least two carriers as a main carrier, send resource allocation information for indicating resource locations of service data on all carriers and service data over the main carrier, and send service data over each carrier except the main carrier; or configured to send the resource allocation information and the service data over each carrier respectively.

Preferably, the sending module 20 may include a single transmitter and be configure to send information over the at least two carriers in a time division multiplexing mode.

Figure 11:
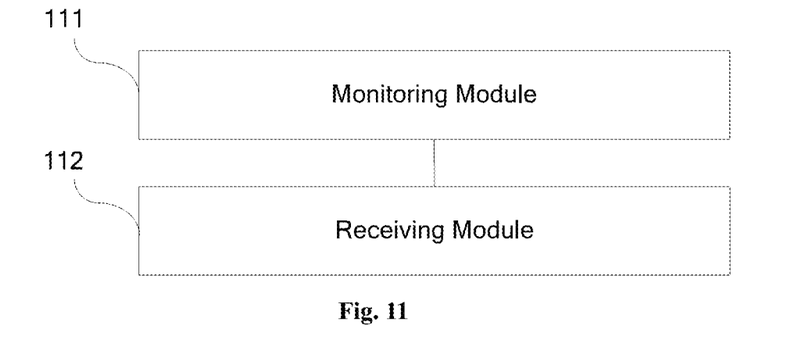
FIG. 11 is a schematic diagram illustrating a structure of a terminal according to still another embodiment of the present disclosure.

Based on the same technical concept as that of the method embodiments, an embodiment of the present disclosure further provides a terminal, and as shown in FIG. 11, the terminal includes: a monitoring module 111 configured to monitor at least one carrier of at least two pre-configured carriers; and a receiving module 112 configured to receive service data sent by another terminal over the at least two carriers according to resource allocation information monitored by the monitoring module 111.

The monitoring module 111 is configured to: monitor a pre-configured main carrier to acquire resource allocation information of all carriers carried on the main carrier; or configured to monitor all carriers to acquire resource allocation information carried on each carrier.

Based on the same technical concept as those of the method embodiments and the device embodiments, an embodiment of the present disclosure further provides a system for communication between terminals, the system includes at least one sending terminal and at least one receiving terminal, where the sending terminal is the terminal described in the device embodiment with reference to FIGS. 8-10, and the receiving terminal is the terminal described in the device embodiment with reference to FIG. 11.

According to the terminal and the system provided by the embodiments of the present disclosure, the communication can be directly carried out between the terminals through a plurality of carriers, and the speed and reliability of the communication between the terminals are improved. When applied to the V2X, multi-PC5 carrier communication between terminals in the V2X can be realized, and the speed and reliability of the V2X service are improved. When the transmission is carried out by adopting the main carrier and the non-main carrier, the receiving side only acquires scheduling information over the main carrier, so that the energy consumption of the receiving side can be reduced. When the scheduling information and the service data are transmitted over all carriers, respectively, the reliability of service transmission can be ensured, and the success of service transmission can be ensured even if partial carrier signals are failed to be transmitted.

It will be understood by those skilled in the art that all or part of the steps of the above methods may be implemented by instructing the relevant hardware through a program, and the program may be stored in a computer readable storage medium, such as a read-only memory, a magnetic or an optical disk, and the like. Alternatively, all or part of the steps of the foregoing embodiments may also be implemented by using one or more integrated circuits, and accordingly, each module/unit in the foregoing embodiments may be implemented in the form of hardware, and may also be implemented in the form of a software functional module. The present disclosure is not limited to any specific form of combination of hardware and software.

Although the embodiments disclosed in the present disclosure are described above, the descriptions are only for the convenience of understanding the present disclosure, and are not intended to limit the present disclosure. It will be understood by those skilled in the art of the present disclosure that various changes in form and details may be made without departing from the spirit and scope of the disclosure, and that the scope of the present disclosure is to be defined only by the appended claims.

INDUSTRIAL APPLICABILITY

The method for communication between terminals, the terminal and the system are provided by the present disclosure. In the method, the terminal determines at least two carriers selected from the pre-configured carriers, and the terminal sends information to another terminal over the at least two carriers, so that the communication can be directly carried out between the terminals through a plurality of carriers, and the speed and reliability of the communication between the terminals are improved. For the V2X service, multi-PC5 carrier communication between terminals in the V2X can be realized, and the speed and reliability of the V2X service are improved.

What is claimed is:

1. A method for communication between terminals, comprising steps of:
   determining, by a terminal, at least two carriers selected from pre-configured carriers; and
   sending, by the terminal, information to another terminal over the at least two carriers, wherein the information comprises resource allocation information and service data, wherein the resource allocation information is used for indicating a resource location of the service data on a carrier, and types of the service data on different carriers are different from each other,
   wherein the step of determining, by a terminal, at least two carriers selected from pre-configured carriers comprises:
   in a case where the terminal is not in a coverage of a base station, sensing, by the terminal by measuring energy of a reference signal in a candidate resource pool, a plurality of PC5 carriers, and selecting, by the terminal, at least two PC5 carriers from the plurality of sensed PC5 carriers, wherein the method is applied to Vehicle-to-Everything (V2X).

2. The method for communication between terminals of claim 1, wherein the terminal selects the at least two carriers from the pre-configured carriers according to at least one of the following conditions: carrier priority, capability of the terminal, congestion level of carrier, pre-configured rule, or service requirement.

3. The method for communication between terminals of claim 1, wherein the step of sending, by the terminal, information to another terminal over the at least two carriers respectively comprises:
determining, by the terminal, one of the at least two carriers as a main carrier, and sending, by the terminal, resource allocation information for indicating resource locations of service data on all carriers and service data over the main carrier; and sending, by the terminal, service data over each carrier except the main carrier; or
sending, by the terminal, the resource allocation information and the service data over each carrier, respectively.

4. The method for communication between terminals of claim 1, wherein,
in a case where the terminal comprises a single transmitter, the terminal sends the information over the at least two carriers in a time division multiplexing mode.

5. A method for communication between terminals, comprising steps of:
monitoring, by a terminal, at least one carrier of at least two pre-configured carriers; and
receiving, by the terminal, service data sent by another terminal over the at least two carriers according to monitored resource allocation information, wherein the resource allocation information is used for indicating a resource location of the service data on a carrier, and types of the service data on different carriers are different from each other,
wherein the other terminal selects the at least two carriers from a plurality of PC5 carriers sensed by the other terminal by measuring energy of a reference signal in a candidate resource pool in a case where the other terminal is not in a coverage of a base station,
wherein the method is applied to Vehicle-to-Everything (V2X).

6. The method for communication between terminals of claim 5, wherein the step of monitoring, by a terminal, at least one carrier of at least two pre-configured carriers comprises:
monitoring, by the terminal, a pre-configured main carrier to acquire resource allocation information of all carriers carried on the main carrier; or
monitoring, by the terminal, all carriers to acquire resource allocation information carried on each carrier.

7. A V2X terminal, comprising:
a processor; and
a storage configured to store instructions,
wherein the processor is configured to execute the instructions to perform the method of claim 1.

8. The terminal of claim 7, wherein the processor is further configured to execute the instructions to:
select the at least two carriers from the pre-configured carriers according to at least one of the following conditions: carrier priority, congestion level of carrier, pre-configured rule, capability of the terminal, or service requirement.

9. The terminal of claim 7, wherein the processor is further configured to execute the instructions to:
determine one of the at least two carriers as a main carrier, and send resource allocation information for indicating resource locations of service data on all carriers and service data over the main carrier, and send service data over each carrier except the main carrier; or
send the resource allocation information and the service data over each carrier respectively.

10. The terminal of claim 7, wherein the terminal comprises a single transmitter and is configured to send the information over the at least two carriers in a time division multiplexing mode.

11. A V2X terminal, comprising:
a processor; and
a storage configured to store instructions,
wherein the processor is configured to execute the instructions to perform the method of claim 5.

12. The terminal of claim 11, wherein the processor is further configured to execute the instructions to:
monitor a pre-configured main carrier to acquire resource allocation information of all carriers carried on the main carrier; or
monitor all carriers to acquire resource allocation information carried on each carrier.

13. A system for communication between terminals, applied to V2X, comprising a sending terminal and a receiving terminal, wherein,
the sending terminal is the terminal of claim 7; and
the receiving terminal comprises a processor; and a storage configured to store instructions,
wherein the processor is configured to execute the instructions to:
monitor at least one carrier of at least two pre-configured carriers; and
receive service data sent by another terminal over the at least two carriers according to monitored resource allocation information.

14. A device comprising a processor and a memory storing processor-executable instructions which, when executed by the processor, cause the processor to perform the steps in the method of claim 1.

15. A non-transitory computer-readable storage medium having stored thereon a computer program comprising executable instructions which, when executed by a processor, cause the processor to perform the method of claim 1.

16. A device comprising a processor and a memory storing processor-executable instructions which, when executed by the processor, cause the processor to perform the steps in the method of claim 5.

17. A non-transitory computer-readable storage medium having stored thereon a computer program comprising executable instructions which, when executed by a processor, cause the processor to perform the method of claim 5.

* * * * *